(12) United States Patent
Dalmatov (10) Patent No.: US 11,593,327 B2
(45) Date of Patent: Feb. 28, 2023

(54) SEGMENTED INDEX FOR DATA DEDUPLICATION

(71) Applicant: EMC IP Holding Company LLC, Hopkinton, MA (US)

(72) Inventor: Nickolay Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 17/038,814

(22) Filed: Sep. 30, 2020

(65) Prior Publication Data
US 2021/0286781 A1    Sep. 16, 2021

(30) Foreign Application Priority Data
Mar. 13, 2020   (RU) .......................... RU2020110749

(51) Int. Cl.
*G06F 16/215*   (2019.01)
*G06F 16/22*    (2019.01)

(52) U.S. Cl.
CPC ............ *G06F 16/215* (2019.01); *G06F 16/22* (2019.01)

(58) Field of Classification Search
CPC ..... G06F 16/215; G06F 16/22; G06F 16/1752
See application file for complete search history.

(56) References Cited

U.S. PATENT DOCUMENTS

| | | | |
|---|---|---|---|
| 10,268,381 B1 | 4/2019 | Armangau et al. | |
| 10,289,566 B1 | 5/2019 | Dalmatov et al. | |
| 10,372,687 B1 | 8/2019 | Armangau et al. | |
| 10,579,593 B2 | 3/2020 | Bassov et al. | |
| 10,585,594 B1 | 3/2020 | Armangau et al. | |
| 10,845,994 B1 | 11/2020 | Usvyatsky et al. | |
| 11,093,454 B2 | 8/2021 | Armangau et al. | |
| 11,216,199 B2 | 1/2022 | Armangau et al. | |
| 2011/0276781 A1* | 11/2011 | Sengupta ............ | G06F 12/0897 711/216 |
| 2012/0166401 A1* | 6/2012 | Li ....................... | G06F 16/2255 707/E17.005 |

* cited by examiner

*Primary Examiner* — Anhtai V Tran
*Assistant Examiner* — Xiaoqin Hu
(74) *Attorney, Agent, or Firm* — BainwoodHuang (57) ABSTRACT

A deduplication index is generated having multiple entries, each entry storing a digest of a data block that was previously stored in non-volatile data storage together with a pointer to the location in non-volatile storage at which the data block was previously stored. The entries of the disclosed deduplication index are divided into multiple deduplication index segments. A resident subset of the deduplication index segments is stored in memory of the data storage system. A non-resident subset of the deduplication index segments is stored in non-volatile data storage of the data storage system. Data deduplication is performed for each subsequently received data block for which a digest is generated that matches any one of the digests in the entries of the deduplication index segments that are contained in the resident subset of the deduplication index segments.

10 Claims, 5 Drawing Sheets

SEGMENTED INDEX FOR DATA DEDUPLICATION

RELATED APPLICATIONS

This application claims priority to Russian Patent Application number 2020110749, filed in the Russian Patent Office on Mar. 13, 2020, entitled SEGMENTED INDEX FOR DATA DEDUPLICATION, the entire contents of which is hereby incorporated herein by reference.

TECHNICAL FIELD

The present disclosure relates generally to intelligent data storage systems, and more specifically to technology for providing a segmented index for detecting duplicate data blocks during inline data deduplication.

BACKGROUND

Data storage systems are arrangements of hardware and software that may include one or more storage processors coupled to non-volatile data storage drives, such as solid state drives and/or magnetic disk drives. The storage processors service host I/O operations received from physical and/or virtual host machines ("hosts"). The I/O operations may specify one or more data storage objects (e.g. storage volumes, files, etc.) that are hosted by the storage system and written and read by the hosts. The storage processors store and execute software that manages incoming I/O operations and perform various data processing tasks to organize and secure host data that is received from the host machines and stored on the non-volatile data storage drives.

Some data storage systems use data deduplication to eliminate storing multiple copies of the same data into non-volatile data storage. Data deduplication advantageously minimizes consumption of the data storage system's non-volatile data storage resources, and reduces wear on flash-memory based data storage devices. Data deduplication recognizes that individual data blocks may be shared by multiple data sets, such as storage volumes and/or files, and operates with the objective of storing only a single copy of each shared data block into the non-volatile data storage resources of the data storage system.

SUMMARY

A data deduplication process needs to detect when a received data block is a duplicate of a previously stored data block, in order to avoid storing multiple copies of the same data block into non-volatile data storage. To efficiently detect duplicate data blocks without having to compare complete data blocks, the data deduplication process may apply a cryptographic hash function to each received data block, in order to generate a relatively short digest (sometimes also referred to as a digital "fingerprint") of the data block. The specific cryptographic hash function used for this purpose may be selected such that for sufficiently large data blocks, the probability of generating the same digest for two different data blocks is statistically impossible or near-impossible. The digests of data blocks that were previously stored into non-volatile data storage may be stored in entries of a data structure referred to as a deduplication index. Each entry in the deduplication index may contain a digest of a previously stored data block, together with the location of the previously stored data block in non-volatile data storage (e.g. a pointer to the location in non-volatile data storage where the data block was previously stored). For example, while the data storage system processes each received I/O write request, the data deduplication process may generate a digest for each data block received in and/or indicated by the I/O write request, such that a digest is generated for each "received data block" in each I/O write request. The data deduplication process then compares the digests of the received data blocks to the digests stored in the entries of the deduplication index. In response to detecting a match between a digest generated for a received data block and a digest in an entry of the deduplication index, the deduplication process determines that the received data block is a duplicate of a previously stored data block, and performs deduplication in order to avoid storing multiple copies of the same data block into non-volatile data storage. For example, the data duplication process may read the pointer to the location in non-volatile data storage of the previously stored data block from the deduplication index entry that also stores the digest matching the digest generated for the received data block, and then store that pointer into non-volatile data storage as part of the data set indicated by the I/O write request currently being processed, instead of storing a complete duplicate copy of the previously stored data block.

For example, a data block may be shared by a first data set and a second data set. In the case where the data block is initially stored into non-volatile data storage during processing of an I/O write request directed to the first data set, a digest of the data block is generated and stored in an entry of the deduplication index together with a pointer to the location in non-volatile data storage at which the data block was stored. Subsequently, an I/O write request directed to the second data set may be received that attempts to store the same data block within the second data set. While processing the I/O write request directed to the second data set, the data deduplication process generates a digest for the subsequently received copy of the shared data block, and compares that digest to the digests stored in the entries of the deduplication index. In response to detecting a match between i) the digest generated for the copy of the shared data block received during processing of the I/O write request directed to the second data set and ii) the digest previously generated and stored in the deduplication index during processing of the earlier I/O write request directed to the first data set, the deduplication process determines that the received data block in the second data set is a duplicate copy of the previously stored data block. As a result of determining that the received data block is a duplicate, the data deduplication process performs deduplication by storing the pointer to the location in non-volatile data storage of the previously stored copy of the shared data block as part of the second data set in non-volatile data storage, thus enabling the data storage system to return the shared data block when processing subsequently received I/O read requests directed to the second data set by accessing the initially stored copy of the data block in the first data set through the pointer to the shared data block contained in the second data set, without having to store a complete duplicate copy of the shared data block in the second data set.

As the amount of data blocks stored in the non-volatile data resources of a data storage system increases, the size of the deduplication index may become so large that the amount of the data storage system's memory needed to store the complete deduplication index becomes unacceptable. At the same time, because deduplication of received data blocks requires accessing the deduplication index in order to process each received I/O write request, storing the complete deduplication index in the non-volatile storage of the data storage system would degrade performance with regard to processing of I/O requests.

In order to address the above described and other technical shortcomings of previous data storage systems, new technology is disclosed herein that generates a deduplication index having multiple entries, each entry storing a digest of a data block that was previously stored in non-volatile data storage together with a pointer to the location in non-volatile storage at which the data block was previously stored. The entries of the disclosed deduplication index are divided into multiple deduplication index segments. A resident subset of the deduplication index segments is stored in memory of the data storage system. A non-resident subset of the deduplication index segments is stored in non-volatile data storage of the data storage system. Data deduplication is performed for each subsequently received data block for which a digest is generated that matches any one of the digests in the entries of the deduplication index segments that are contained in the resident subset of the deduplication index segments. The digests of the received data blocks are not compared to the digests stored in the entries of deduplication index segments contained in the non-resident subset of deduplication index segments.

In some embodiments, each deduplication index segment is made up of entries containing digests generated from data blocks received and stored in the non-volatile data storage of the data storage system during a corresponding one of multiple preceding time periods, together with pointers to the locations in non-volatile storage at which those data blocks were stored. This is because each deduplication index segment may initially be generated as an open deduplication segment, as further described herein, and the corresponding preceding time period for each deduplication index may accordingly consist of the time period starting when the deduplication index segment was originally created as an open deduplication index segment and ending at the time at which the size of that open deduplication segment reached the maximum deduplication index segment size and the open deduplication index segment was accordingly made into one of the resident subset of the deduplication index segments.

In some embodiments, digests generated from subsequently received data blocks that do not match any of the digests contained in the entries of the resident subset of the deduplication index segments are stored into entries of an open deduplication index segment also stored in the memory of the data storage system. For example, for each digest generated from a subsequently received data block that does not match any of the digests contained in the entries of the resident subset of the deduplication index segments, a new entry may be added to the open deduplication index segment that stores the digest together with a pointer to a location in non-volatile data storage at which the data block is stored.

In some embodiments, the disclosed technology also performs data deduplication for each subsequently received data block for which a digest is generated that matches any one of the digests in the entries of the open deduplication index.

In some embodiments, data deduplication is performed for each subsequently received data block having a digest matching any one of the digests stored in the entries in the deduplication index segments contained in the resident subset of the deduplication index segments or in the open deduplication index segment at least in part by storing, in the non-volatile data storage of the data storage system, a pointer to the location in the non-volatile data storage at which a previously received copy of the subsequently received data block was stored.

In some embodiments, the disclosed technology may detect that the open deduplication index segment has reached a predetermined maximum deduplication index segment size, and in response to detecting that the open deduplication index segment has reached the predetermined maximum deduplication index segment size i) make the open deduplication index segment one of the deduplication index segments in the resident subset of the deduplication index segments, and ii) allocate a new open deduplication index segment within the memory of the data storage system.

In some embodiments, the disclosed technology may maintain usage ratios for the deduplication index segments, such that each deduplication index segment has a usage ratio indicating how often digests in the deduplication index segment match digests of data blocks received by the data storage system. In response to the usage ratios maintained for the deduplication index segments, the disclosed technology may select as the resident subset of the deduplication index segments one or more deduplication index segments having relatively higher usage ratios than the other deduplication index segments.

In some embodiments, the disclosed technology may detect that a deduplication index segment in the non-resident subset of the deduplication index segments has a higher usage ratio than a usage ratio of one of the deduplication index segments in the resident subset of the deduplication index segments. In response to detecting that that the deduplication index segment in the non-resident subset of the deduplication index segments has a higher usage ratio than the usage ratio of the one of the deduplication index segments in the resident subset of the deduplication index segments, the disclosed technology may i) move the deduplication index segment in the non-resident subset of the deduplication index segments having the higher usage ratio to the resident subset of the deduplication index segments, and ii) move the deduplication index segment in the resident subset of the deduplication index segments to the non-resident subset of the deduplication index segments.

In some embodiments, the disclosed technology may, in response to identifying a digest that is contained in both i) an entry in a deduplication index segment in the non-resident subset of the deduplication index segments, and ii) an entry contained in a deduplication index segment in the resident subset of the deduplication index segments, update a pointer stored in the entry contained in the deduplication index segment contained in the non-resident subset of the deduplication index segments to match a pointer in the entry contained in the deduplication index contained in the resident subset of the deduplication index segments.

In some embodiments, the disclosed technology may, in response to identifying a digest that is contained in both i) an entry in a deduplication index segment in the non-resident subset of the deduplication index segments, and ii) an entry contained in the open deduplication index segment, remove the entry contained in the open deduplication index segment.

In some embodiments, the disclosed technology may, in response to detecting the deletion of a data block that was previously stored in the non-volatile data storage, remove at least one entry storing a pointer to the previously stored data block from at least one of the deduplication index segments.

Embodiments of the disclosed technology may provide significant improvements over previous data storage technology. For example, the disclosed technology may reduce the amount of memory consumed in the data storage system to store the deduplication index data structure, since only the resident subset of deduplication index segments are stored in memory. In another example, the disclosed technology may reduce the amount of time required to compare the digest generated for a received data block with previously stored digests, since the digests generated for received data blocks need only be compared with the digests contained in the resident subset of the deduplication index segments. In another example, in some embodiments, the resident subset of the deduplication index segments may advantageously be made up of the most often used deduplication index segments in terms of digest matches, thus improving the likelihood of matches with digests generated from subsequently received data blocks. In addition, the open deduplication index segment may store digests generated from the most recently received new data blocks, thus also improving the likelihood of matches with digests generated from subsequently received data blocks.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein improves over previous technologies by providing a segmented deduplication index having multiple entries. The entries of the deduplication index are divided into segments of the deduplication index. A resident subset of deduplication index segments is stored in a memory of the data storage system, and a non-resident subset of deduplication index segments is stored in the non-volatile data storage of the data storage system. Each entry stores a digest of a data block that was previously stored in non-volatile data storage, together with a pointer to the location in non-volatile storage at which the data block was previously stored. The disclosed technology may perform data deduplication for each subsequently received data block for which a digest is generated that matches any one of the digests stored in the entries of i) the deduplication index segments contained in the resident subset of the deduplication index segments, or ii) an open deduplication index segment that is also stored in memory. Each deduplication index segment may be made up of entries that contain digests generated from data blocks received during a corresponding one of multiple preceding time periods, together with pointers to the locations in non-volatile storage at which those data blocks were stored. The disclosed technology may store digests generated from subsequently received data blocks that do not match any of the digests contained in the entries of the resident subset of the deduplication index segments or the open deduplication index segment into new entries added to the open deduplication index segment. When the open deduplication index segment reaches a maximum deduplication index segment size, it may be made one of the resident subset of deduplication index segments, and a new open deduplication index segment is allocated in the memory of the data storage system. The resident subset of deduplication index segments may be maintained as consisting of those deduplication index segments that are most often used, e.g. those deduplication index segments that have relatively higher usage ratios than other deduplication index segments.

Figure 1:
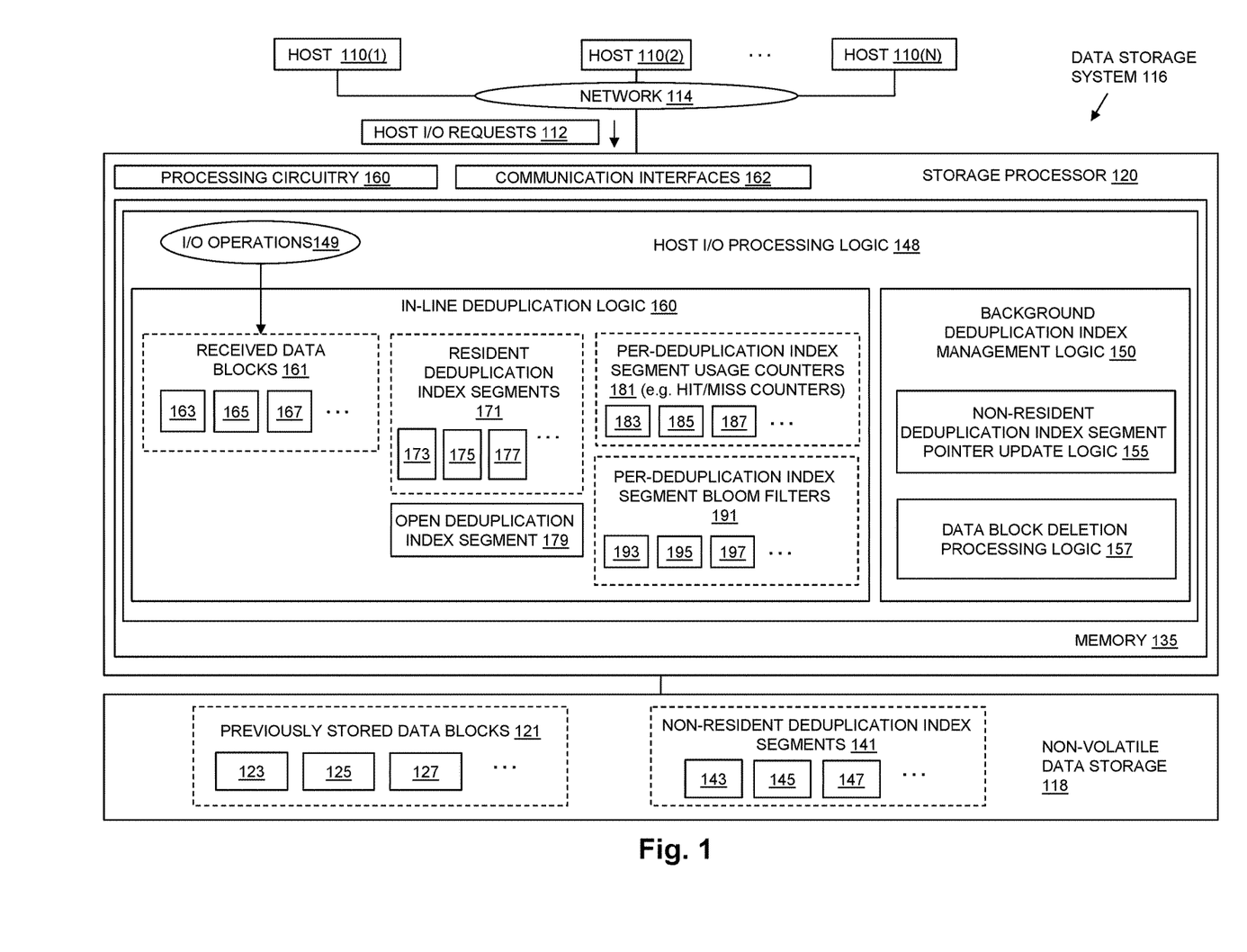
FIG. 1 is a block diagram showing an example of a data storage system in which an example of the disclosed technology is embodied.

FIG. 1 is a block diagram showing an operational environment for the disclosed technology, including an example of a data storage system in which the disclosed technology may be embodied. FIG. 1 shows some number of physical and/or virtual Host Computing Devices 110, referred to as "hosts" and shown for purposes of illustration by Hosts 110(1) through 110(N). The hosts issue Host I/O Requests 112 to access non-volatile data storage provided by Data Storage System 116, in some embodiments over one or more virtual or physical networks, such as a local area network (LAN), and/or a wide area network (WAN) such as the Internet, etc., as shown for purposes of illustration in FIG. 1 by Network 114, and which may be communicably coupled to Storage Processor 120 through Communication Interfaces 162. Data Storage System 116 may include at least one Storage Processor 120, and Non-Volatile Data Storage 118. No particular hardware configuration is required, and Storage Processor 120 may be embodied as any specific type of device(s) capable of processing host input/output (I/O) requests received from Hosts 110 (e.g. I/O read and I/O write operations, etc.).

The Non-Volatile Data Storage 118 of Data Storage System 116 may include some number of physical data storage drives such as solid state drives, magnetic disk drives, hybrid drives, optical drives, and/or other specific types of drives. Non-Volatile Data Storage 118 may be directly physically connected to and/or contained within Storage Processor 120, and/or may be communicably connected to Storage Processor 120 by way of one or more computer and/or communication networks.

A Memory 135 in Storage Processor 120 stores program code that is executable on Processing Circuitry 160. Memory 135 may include relatively high speed volatile memory (e.g. RAM). The Processing Circuitry 160 may, for example, include or consist of one or more microprocessors, e.g. central processing units (CPUs), multi-core processors, chips, and/or assemblies, and associated circuitry. Processing Circuitry 160 and Memory 135 together form control circuitry, which is configured and arranged to carry out various methods and functions as described herein. The Memory 135 stores a variety of software components that may be provided in the form of executable program code (e.g. executable instructions). For example, Memory 135 may include software components such as Host I/O Processing Logic 148. When program code in Memory 135 is executed by Processing Circuitry 160, Processing Circuitry 160 is caused to carry out the operations of the software components. Although certain software components are shown and described for purposes of illustration and explanation, those skilled in the art will recognize that Memory 135 may include various other software components, such as an operating system, various applications, other processes, etc.

While processing Host I/O Requests 112, Host I/O Processing Logic 148 generates I/O Operations 149 that are performed by Storage Processor 120 on Non-Volatile Data Storage 118. To process I/O write requests in Host I/O Requests 112, I/O Operations 149 are generated that include I/O write operations that pass Received Data Blocks 161 to In-Line Deduplication Logic 160 for possible deduplication processing prior to being stored in Non-Volatile Data Storage 118. For purposes of illustration, Received Data Blocks 161 are shown including received data blocks 163, 165, and 167. Received Data Blocks 161 may be blocks of data received in Host I/O Requests 112 that are to be stored within Non-Volatile Data Storage 118 as part of one or more specific data sets (e.g. as part of one or more storage volumes and/or files). The specific data set into which each received data block is to be stored may be indicated within one or more of the Host I/O Requests 112 and/or one or more of the I/O Operations 149.

In-Line Deduplication Logic 160 may detect when one of the received data blocks in Received Data Blocks 161 is a duplicate of a previously stored data block, e.g. may detect when one of the Received Data Blocks 161 is a duplicate of one of the Previously Stored Data Blocks 121. When In-Line Deduplication Logic 160 detects that one of the data blocks in Received Data Blocks 161 is a duplicate of one of the Previously Stored Data Blocks 161, In-Line Deduplication Logic 160 may perform deduplication on that data block in order to avoid storing multiple copies of the same data block into Non-Volatile Data Storage 118. For purposes of illustration, Previously Stored Data Blocks 121 in Non-Volatile Data Storage 118 are shown including previously stored data blocks 123, 125, and 127.

In order to efficiently detect whether one of the received data blocks in Received Data Blocks 161 is a duplicate of one of the previously stored data blocks in Previously Stored Data Blocks 121, In-Line Deduplication Logic 160 first applies a cryptographic hash function to each received data block, in order to generate a relatively short digest (sometimes also referred to as a digital "fingerprint") of that received data block. Any specific cryptographic hash function may be used for this purpose by In-Line Deduplication Logic 160, and preferably a cryptographic hash function is used that operates such that the probability of the hash function generating the same digest for two different data blocks is statistically impossible or near-impossible.

Digests of the data blocks contained in Previously Stored Data Blocks 121 were stored (e.g. previously by In-Line Deduplication Logic 160 at the time those data blocks were previously received) into the entries of a segmented deduplication index. The segmented deduplication index of the disclosed technology that contains the digests generated from previously stored data blocks and pointers to the locations of those previously stored data blocks in Non-Volatile Data Storage 118 is made up of multiple entries, and the entries are divided into multiple deduplication index segments. For example, each deduplication index segment may contain up to a maximum number of deduplication index entries. A first subset of the deduplication index segments is shown in FIG. 1 by Resident Deduplication Index Segments 171. A second subset of the deduplication index segments is shown by Non-Resident Deduplication Index Segments 141. FIG. 1 also shows an Open Deduplication Index Segment 179 that is also one of the multiple deduplication index segments in the deduplication index. Resident Deduplication Index Segments 171 may include one or more deduplication index segments, such as deduplication index segments 173, 175, and 177. Non-Resident Deduplication Index Segments 141 may also include one or more deduplication index segments, such as deduplication index segments 143, 145, and 147. In contrast, there is only one open deduplication index segment at any given point in time. In-Line Deduplication Logic 160 stores Resident Deduplication Index Segments 171 and Open Deduplication Index Segment 179 into Memory 135. In-Line Deduplication Logic 160 stores Non-Resident Deduplication Index Segments 141 into Non-Volatile Data Storage 118.

Each entry in the Resident Deduplication Index Segments 171, Open Deduplication Index Segment, and the Non-Resident Deduplication Index Segments 141, contains a digest of one of the data blocks in Previously Stored Data Blocks 121, together with the specific location in Non-Volatile Data Storage 118 of that previously stored data block (e.g. a pointer to the location in Non-Volatile Data Storage 118 of the previously stored data block for which the digest stored in the same entry was generated). To detect whether one of the received data blocks in Received Data Blocks 161 is a duplicate of one of the previously stored data blocks in Previously Stored Data Blocks 121, In-Line Deduplication Logic 160 compares the digest generated for the received data block to i) the digests stored in the entries contained in the deduplication index segments within Resident Deduplication Index Segments 171, and ii) the digests stored in the entries contained in Open Deduplication Index Segment 179. In-Line Deduplication Logic 160 does not compare digests for received data blocks to digests stored in the entries of deduplication index segments in Non-Resident Deduplication Index Segments 141. In this way, In-Line Deduplication Logic 160 advantageously performs deduplication for received data blocks without having to access the deduplication index segments stored in Non-Volatile Data Storage 118.

In the case that In-Line Deduplication Logic 160 finds a digest matching the digest generated for a received data block in an entry in the segmented deduplication index that is contained in i) one of the segments in the Resident Deduplication Index Segments 171, or ii) the Open Deduplication Index Segment 179, In-Line Deduplication Logic 160 detects that the received data block is a duplicate of one of the Previously Stored Data Blocks 121, and performs deduplication with regard to that received data block. For example, In-Line Deduplication Logic 160 may perform deduplication with regard to a received data block by first reading, from the deduplication index entry containing the digest matching the digest generated for the received data block, the pointer to the location in Non-Volatile Data Storage 118 of a previously stored data block that is the same as the received data block. Then, instead of storing a duplicate copy of the previously received data block into Non-Volatile Data Storage 118, In-Line Deduplication Logic 160 stores only the pointer to the location in Non-Volatile Data Storage 118 of the previously stored data block, thus avoiding storing multiple complete copies of the data block into Non-Volatile Data Storage 118.

For example, In-Line Deduplication Logic 160 may read a pointer to the location in Non-Volatile Data Storage 118 of a data block in Previously Stored Data Blocks 121 from a deduplication index entry contained in Resident Deduplication Index Segments 171 or Open Deduplication Index Segment 179 that also stores a digest matching a digest generated for a received data block, and then store that pointer into Non-Volatile Data Storage 118 as part of a representation of a data set that is indicated by a I/O write request and/or I/O operation currently being processed. The received data block may, for example, be shared by a first data set and a second data set, and the initial copy of the data block may have been stored into Previously Stored Data Blocks 121 during processing of an I/O write request directed to the first data set, at which time a digest of that initial copy of the data block was also generated and stored, e.g. in a new entry added to the Open Deduplication Index Segment 179, together with a pointer to the location in Non-Volatile Data Storage 118 at which the data block was initially stored. Subsequently, an I/O write request directed to the second data set may be received by Storage Processor 120 that attempts to store the same shared data block as part of the second data set. While processing the subsequent I/O write request directed to the second data set, the data deduplication process generates a digest for the subsequently received copy of the shared data block, and compares that digest to the digests stored in the entries of i) the deduplication index segments in Resident Deduplication Index Segments 171, and ii) Open Deduplication Index Segment 179. In response to detecting that there is a match between the digest generated for the subsequently received copy of the shared data block received during processing of the I/O write request directed to the second data set and the digest previously generated and stored during processing of the earlier I/O write request directed to the first data set (e.g. within the Open Deduplication Index Segment 179), In-Line Deduplication Logic 160 determines that the received data block being written as part of the second data set is a duplicate copy of the previously stored data block, i.e. is a duplicate copy of a data block shared by the first and second data sets and previously stored during a write of the first data set. As a result of determining that the received data block is a duplicate, In-Line Deduplication Logic 160 performs a deduplication by storing the pointer to the location in non-volatile data storage of the previously stored copy of the data block as part of the representation of the second data set stored in Non-Volatile Data Storage 118, thus enabling the data storage system to return the shared data block when processing subsequently received I/O read requests directed to the second data set by accessing the initially stored copy of the data block in the first data set through the pointer to the shared data block that is contained in the second data set, without having to store a complete duplicate copy of the shared data block within the representation of the second data set in Non-Volatile Data Storage 118.

Whenever a digest generated by In-Line Deduplication Logic 160 for one of the Received Data Blocks 161 does not match any of the digests stored in the entries contained in i) Resident Deduplication Index Segments 171 or ii) Open Deduplication Index Segment 179, the received data block cannot be deduplicated, and is accordingly stored into Non-Volatile Data Storage 118. In-Line Deduplication Logic 160 also adds a new entry to Open Deduplication Index Segment 179. In-Line Deduplication Logic 160 stores the digest generated for the received data block, together with a pointer to the location in Non-Volatile Data Storage 118 at which the received data block was stored, into the new entry added to Open Deduplication Index Segment 179.

Whenever a new entry is added to Open Deduplication Index Segment 179, the size of Open Deduplication Index Segment 179 is increased. In-Line Deduplication Logic 160 then compares the new size of Open Deduplication Index Segment 179 to a maximum deduplication index segment size. The maximum deduplication index segment size may be a preset or configurable value. For example, the maximum deduplication index segment size may be a maximum number of entries. In another example, the maximum deduplication index segment size may be a maximum size in bytes. In response to detecting that the size of Open Deduplication Index Segment 179 has reached the maximum deduplication index segment size, In-Line Deduplication Logic 160 makes the Open Deduplication Index Segment 179 one of the Resident Deduplication Index Segments 171, and allocates a new open deduplication index segment in Memory 135. The new open deduplication index segment is then used to store new entries created for subsequently received data blocks that have digests that do not match any of the digests i) in the entries of Resident Deduplication Index Segments 171 or ii) in entries previously added to the new open deduplication index segment, until the size of the new open deduplication index segment reaches the maximum deduplication index segment size, at which time it will similarly be made into one of the Resident Deduplication Index Segments 171, and another new open deduplication index segment is allocated in Memory 135.

In-Line Deduplication Logic 160 may maintain a usage ratio for each deduplication index segment in Resident Deduplication Index Segments 171, each deduplication index segment in Non-Resident Deduplication Index Segments 141, and for the Open Deduplication Index Segment 179. The usage ratio maintained by In-Line Deduplication Logic 160 for each deduplication index segment may indicate how often digests in that deduplication index segment match digests generated for data blocks in Received Data Blocks 161. For example, one or more deduplication index segment usage counters may be maintained by In-Line Deduplication Logic 160 for each deduplication index segment, as shown in FIG. 1 by Per-Deduplication Index Segment Usage Counters 181. Per-Deduplication Index Segment Usage Counters 181 may include a hit counter and a miss counter for each deduplication index segment. In-Line Deduplication Logic 160 increments the hit counter for each one of the deduplication index segments each time a digest stored in an entry contained in that deduplication index segment matches an index generated for a received data block. In-Line Deduplication Logic 160 increments the miss counter for each one of the deduplication index segments each time a digest generated for an incoming data block matches none of the digests stored in the entries contained in that deduplication index segment.

The In-Line Deduplication Logic 150 may calculate a usage ratio for each deduplication index segment that is equal to the ratio between a current value of the hit counter for that deduplication index segment and a current value of the miss counter for that deduplication index segment. Significantly, In-Line Dedupli cation Logic 160 maintains usage counters and a usage ratio not only for Resident Deduplication Index Segments 171 and Open Deduplication Index Segment 179, but also for Non-Resident Deduplication Index Segments 191. In this way, In-Line Deduplication Logic 148 can monitor how frequently digests generated for received data blocks match any of the deduplication index segments, including the deduplication index segments in Non-Resident Deduplication Index Segments 141.

In some embodiments, In-Line Deduplication Logic 160 uses the individual usage ratios that it maintains for the deduplication index segments to determine which deduplication index segments are selected for Resident Deduplication Index Segments 171, and therefore stored Memory 135, and which deduplication index segments are selected for Non-Resident Deduplication Index Segments 141, and therefore stored in Non-Volatile Data Storage 118. For example, at any given point in time, In-Line Deduplication Logic 160 may select as Resident Deduplication Index Segments 171 one or more deduplication index segments having relatively higher usage ratios than the usage ratios of deduplication index segments in Non-Resident Deduplication Index Segments 141. Open Deduplication Index Segment 179 may be maintained in Memory 135 regardless of its usage ratio, until its size reaches the maximum deduplication index segment size, at which time it becomes one of the Resident Deduplication Index Segments 171, and may be moved to Non-Resident Deduplication Index Segments 141, e.g. in the case where one of the deduplication index segments in Non-Resident Deduplication Index Segments 141 has a higher usage ratio.

In some embodiments, In-Line Deduplication Logic 160 may detect that a deduplication index segment in Non-Resident Deduplication Index Segments 141 has a higher usage ratio than the usage ratio of one of the deduplication index segments in Resident Deduplication Index Segments 171. In response to detecting that that the deduplication index segment in Non-Resident Deduplication Index Segments 141 has a higher usage ratio than the usage ratio of one of the deduplication index segments in Resident Deduplication Index Segments 171, In-Line Deduplication Logic 160 may i) move the deduplication index segment in Non-Resident Deduplication Index Segments 141 having the higher usage ratio to Resident Deduplication Index Segments 171, and ii) move the deduplication index segment in Resident Deduplication Index Segments 171 having the lower usage ratio to Non-Resident Deduplication Index Segments 141.

In some embodiments, in order to increase the speed at which it determines whether digests generated Received Data Blocks 161 match any of the digests in each deduplication index segment, In-Line Deduplication Logic 160 may maintain a Bloom filter for each deduplication index segment. For example, the Bloom filter for each deduplication index segment may be maintained such that it can be passed a digest generated for a received data block and will efficiently determine whether the digest is contained in any entry of the deduplication index segment, and then return an indication of whether the digest is contained in any entry of the deduplication index segment. For purposes of illustration, such Bloom filters maintained for each deduplication index segment are shown in FIG. 1 by Per-Deduplication Index Segment Bloom Filters 191, which include Bloom filters 193, 195, and 197. A Bloom filter may be maintained for each deduplication index segment in Resident Deduplication Index Segments 171, each deduplication index segment in Non-Resident Deduplication Index Segments 141, and for Open Deduplication Index Segment 179. Accordingly, when updating the Per-Deduplication Index Segment Usage Counters 181 based on a given digest generated for a received data block in Received Data Blocks 161, In-Line Deduplication Logic 160 may pass the digest to each one of the Per-Deduplication Index Segment Bloom Filters 191 in order to efficiently determine which counters should be incremented in Per-Deduplication Index Segment Usage Counters 181, without having to directly compare the digest to the digests contained in all the deduplication index segments.

Those skilled in the art will recognize that when a digest generated by In-Line Deduplication Logic 160 for one of the Received Data Blocks 161 does not match any of the digests stored in the entries contained in i) Resident Deduplication Index Segments 171 or ii) Open Deduplication Index Segment 179, that digest may still match one of the digests stored in the deduplication index segments contained in Non-Resident Deduplication Index Segments 141. However, In-Line Deduplication Logic 160 will not detect that the generated for the received data block matches a digest stored in an entry contained in Non-Resident Deduplication Index Segments 141, because In-Line Deduplication Logic 160 does not compare the digests generated for received data blocks to the digests stored in Non-Resident Deduplication Index Segments 141. To address this, a number of background processes may be provided by Host I/O Processing Logic 148 to perform specific operations. An example of such background processes are shown for purposes of illustration in FIG. 1 by Background Deduplication Index Management Logic 150.

In some embodiments, Non-Resident Deduplication Index Segment Pointer Update Logic 155 may include or consist of a background process that compares the digests stored in the entries contained in Non-Resident Deduplication Index Segments 141 to the digests stored in the entries contained in the Resident Deduplication Index Segments 171. Non-Resident Deduplication Index Segment Pointer Update Logic 155 may, in response to identifying a digest that is stored in both i) an entry in a deduplication index segment contained in Non-Resident Deduplication Index Segments 141, and ii) an entry in a deduplication index segment contained in Resident Deduplication Index Segments 171, update a pointer stored in the entry in the deduplication index segment contained in Non-Resident Deduplication Index Segments 141 to match a pointer stored in the entry in the deduplication index contained in Resident Deduplication Index Segments 171.

In some embodiments, Non-Resident Deduplication Index Segment Pointer Update Logic 155 may, in response to identifying a digest that is stored in both i) an entry in a deduplication index segment contained in Non-Resident Deduplication Index Segments 141, and ii) an entry in Open Deduplication Index Segment 179, remove the entry in Open Deduplication Index Segment 179 from Open Deduplication Index Segment 179.

In some embodiments, Data Block Deletion Processing Logic 157 may include or consist of a background process that detects the deletion of specific data blocks that have previously been stored in Non-Volatile Data Storage 118, e.g. in Previously Stored Data Blocks 121, and then removes entries storing pointers to the deleted data blocks from the deduplication index segments. For example, Data Block Deletion Processing Logic 157 may remove entries storing pointers to deleted data blocks from deduplication index segments in Resident Deduplication Index Segments 171, from deduplication index segments in Non-Resident Deduplication Index Segments 141, and/or from Open Deduplication Index Segment 179. For example, Data Block Deletion Processing Logic 157 may detect the deletion of a data set (e.g. a storage volume or file), and then remove deduplication index entries storing pointers to data blocks within the deleted data set from the deduplication index segments that contain those entries, e.g. based on back pointers or the like in the deleted data set indicating the specific deduplication index entries that store pointers to the data blocks contained within the deleted data set.

Figure 2:
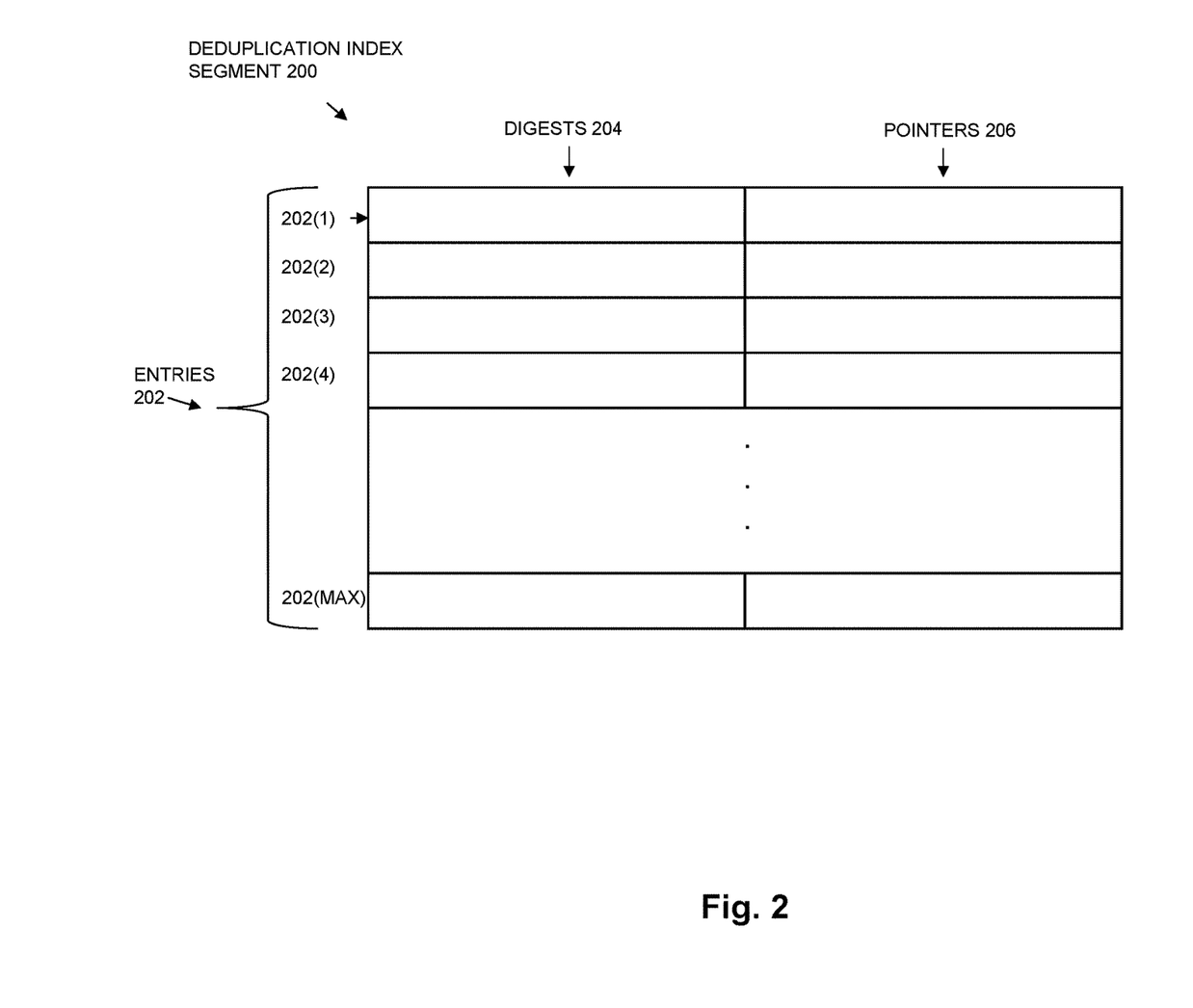
FIG. 2 is a block diagram showing an example of a deduplication index segment in some embodiments.

FIG. 2 is a block diagram showing an example of a Deduplication Index Segment 200 in some embodiments. As shown in FIG. 2, Deduplication Index Segment 200 is made up of Entries 202, shown for purposes of illustration by entries 202(1), 202(2), 202(3), 202(4), and so on through entry 202(MAX), where MAX is equal to a maximum deduplication index segment size in terms of a maximum number of entries that may be contained in any individual deduplication index segment. As further shown in FIG. 2, the Entries 202 are made up of Digests 204 and Pointers 206, such that each one of the entries stores a digest of a data block that was previously stored in non-volatile data storage, together with a pointer to the location in non-volatile storage at which that data block was previously stored. As further described herein, digests of received data blocks may be compared to the digests stored in the entries of Deduplication Index Segment 200 until a match is found. Data deduplication may then be performed such that the pointer stored in the same entry storing the digest matching the digest of the received data block is stored into non-volatile data storage instead of the complete received data block, in order to prevent storing a duplicate copy of a previously stored data block.

Figure 3:
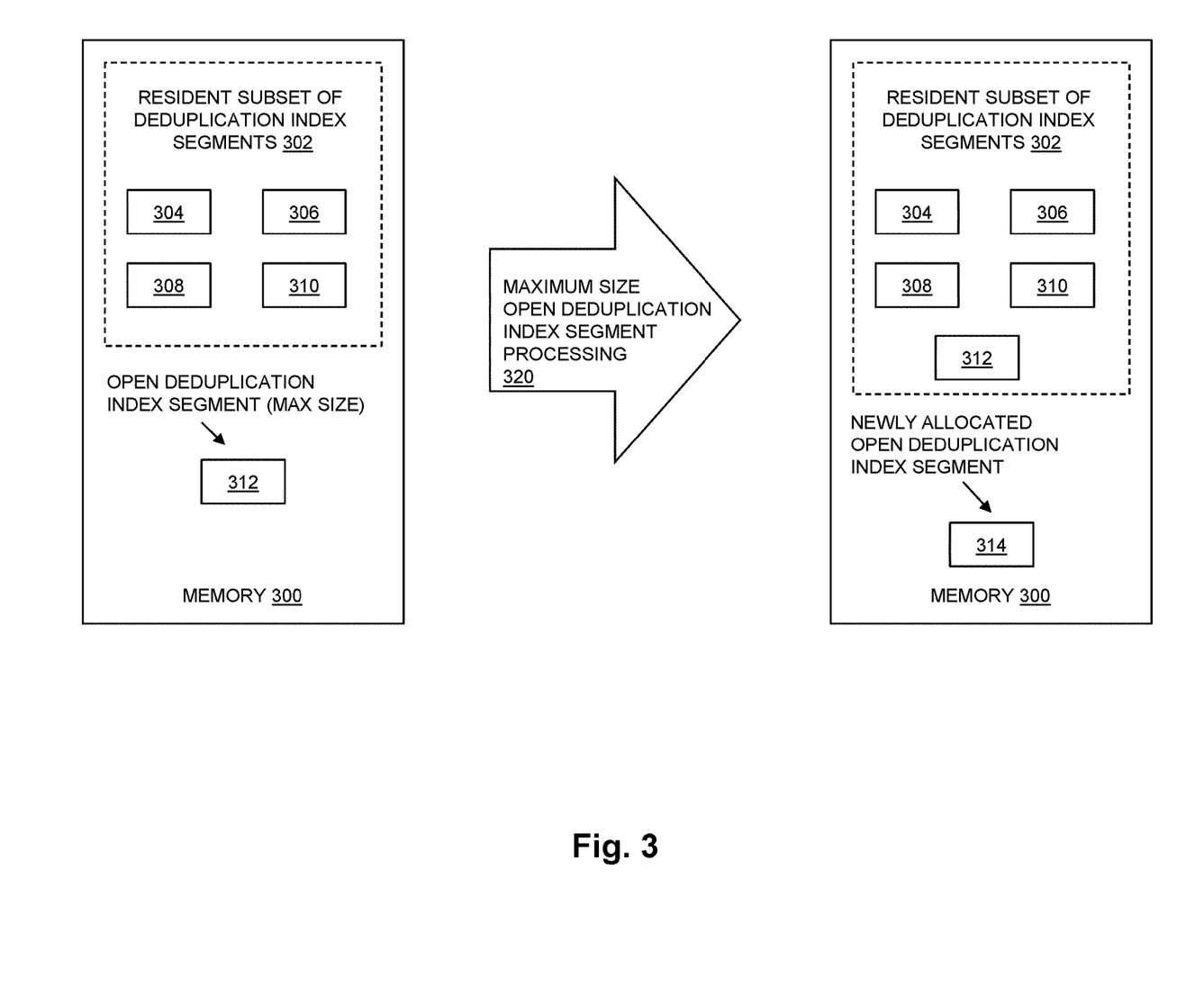
FIG. 3 is a block diagram illustrating an example of processing performed when an open deduplication index segment reaches the maximum deduplication index segment size in some embodiments.

FIG. 3 is a block diagram illustrating an example of processing performed when an open deduplication index segment reaches the maximum deduplication index segment size ("MAX"). In some embodiments, each deduplication index segment may initially be created as an open deduplication index segment, with entries being added to the open deduplication index segment until the number of entries in the open deduplication index segment is equal to MAX, and the open deduplication index segment is accordingly full. In the example of FIG. 3, Memory 300 stores a Resident Subset of Deduplication Index Segments 302, and Open Deduplication Index Segment 312. Resident Subset of Deduplication Index Segments 302 is shown initially containing deduplication index segments 304, 306, 308, and 310. Further in the example of FIG. 3, the disclosed technology (e.g. In-Line Deduplication Logic 160) has detected that Open Deduplication Index Segment 312 has reached the maximum deduplication index segment size, e.g. that the number of entries in Open Deduplication Index Segment 312 has reached MAX. In response to detecting that Open Deduplication Index Segment 312 has reached the maximum deduplication index segment size, and as shown by Maximum Size Open Deduplication Index Segment Processing 320, the disclosed technology may add Open Deduplication Index Segment 312 to the Resident Subset of Deduplication Index Segments 302, resulting in Resident Subset of Deduplication Index Segments 302 containing the deduplication index segments 304, 306, 308, 310, and 312. Further in response to detecting that Open Index Segment 312 has reached the maximum deduplication index segment size, the disclosed technology may also allocate Newly Allocated Open Deduplication Index Segment 314 in Memory 300.

In some embodiments, in response to detecting that Open Deduplication Index Segment 312 has reached the maximum deduplication index segment size, the disclosed technology may, before adding Open Deduplication Index Segment 312 to Resident Subset of Deduplication Index Segments 302, determine whether a maximum amount of Memory 300 that may be used to store Resident Subset of Deduplication Index Segments 302 (i.e. a previously configured resident deduplication index segment subset memory budget or the like) has already been used to store deduplication index segments previously added to Resident Subset of Deduplication Index Segments 302. If not, then the disclosed technology may simply add Open Deduplication Index Segment 312 to Resident Subset of Deduplication Index Segments 302, as shown in FIG. 3. Otherwise, if the maximum amount of Memory 300 that may be used to store Resident Subset of Deduplication Index Segments 302 has already been used, then Open Deduplication Index Segment 312 may instead be added to the non-resident subset of deduplication index segments (e.g. to Non-Resident Subset of Deduplication Index Segments 141 shown in FIG. 2). In some embodiments, the disclosed technology may further operate to determine whether the open deduplication index is added to the resident subset of deduplication index segments or the non-resident deduplication index segments based on a usage ratio of the open deduplication index segment, such that the open deduplication index segment is added to either the resident subset of deduplication index segments or the non-resident subset of deduplication index segments such that after addition of the full open deduplication index segment to the resident subset of deduplication index segments, or alternatively to the non-resident subset of deduplication index segments, the resident subset of deduplication index segments contains deduplication index segments all having relatively higher usage ratios than the usage ratios of the deduplication index segments contained in the non-resident subset of deduplication index segments.

Figure 4:
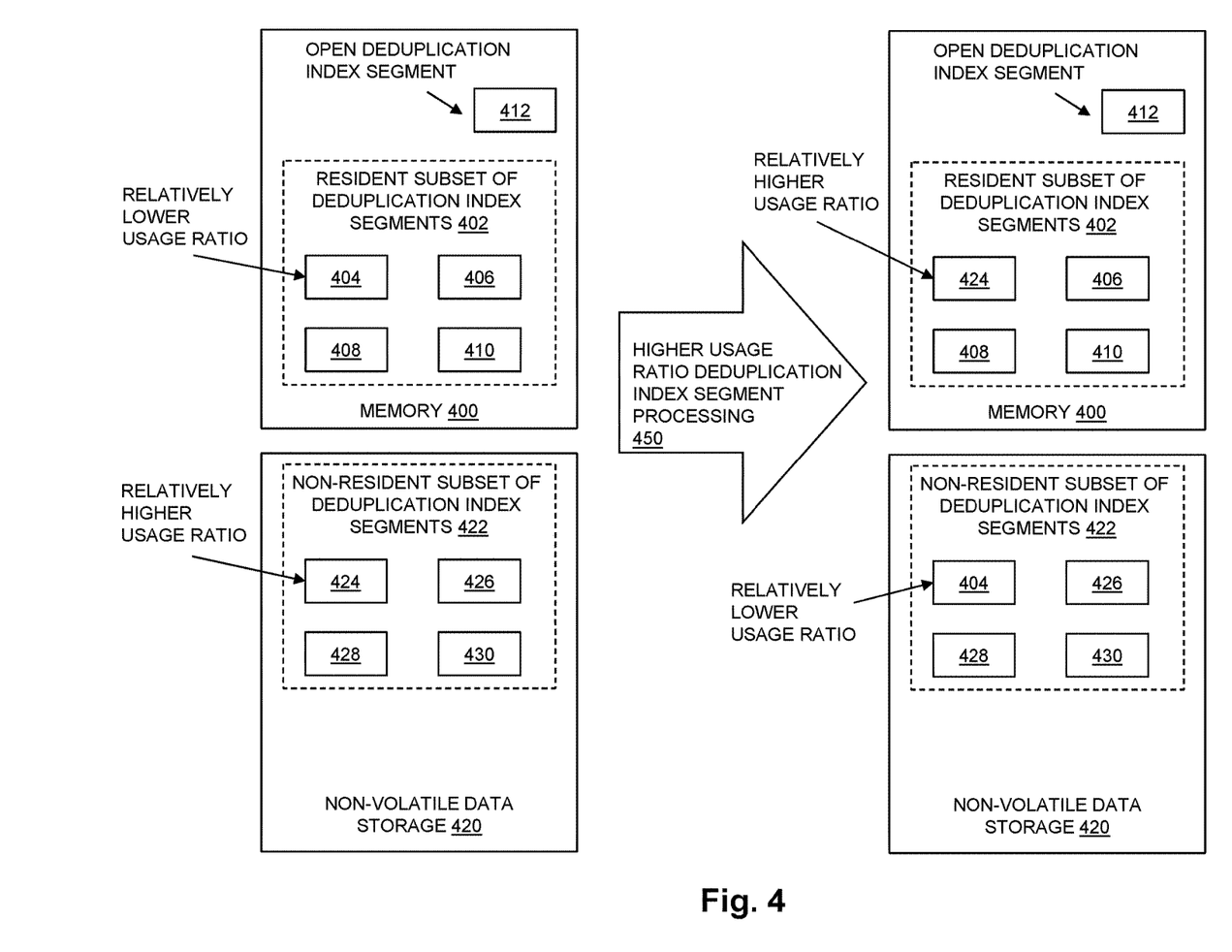
FIG. 4 is a block diagram illustrating an example of processing performed in response to detecting that a deduplication index segment contained in the non-resident deduplication index segments has a higher usage ratio than the usage ratio of a deduplication index segment contained in the resident deduplication index segments.

FIG. 4 is a block diagram illustrating an example of processing (e.g. Higher Usage Ratio Deduplication Index Segment Processing 450) that may be performed in response to the disclosed technology detecting that a deduplication index segment contained in Non-Resident Deduplication Index Segments 422 has a higher usage ratio than the usage ratio of a deduplication index segment contained in the Resident Subset of Deduplication Index Segments 402. In the example of FIG. 4, Memory 400 is shown storing an Open Deduplication Index Segment 412 and the Resident Subset of Deduplication Index Segments 402. Non-Volatile Data Storage 420 is shown storing Non-Resident Subset of Deduplication Index Segments 422. Initially, Resident Subset of Deduplication Index Segments 402 contains deduplication index segments 404, 406, 408, and 410, and Non-Resident Subset of Deduplication Index Segments 422 contains deduplication index segments 424, 426, 428, and 430. At some point during operation, the disclosed technology (e.g. In-Line Duplication Logic 160 shown in FIG. 1) detects that deduplication index segment 424 has a relatively higher usage ratio than deduplication index segment 404. In response to detecting that deduplication index segment 424 has a relatively higher usage ratio than deduplication index segment 404, the disclosed technology may perform Higher Usage Ratio Deduplication Index Segment Processing 450. Higher Usage Ratio Deduplication Index Segment Processing 450 moves deduplication index segment 424 from Non-Resident Subset of Deduplication Index Segments 422 to Resident Subset of Deduplication Index Segments 402, and moves deduplication index segment 404 from Resident Subset of Deduplication Index Segments 402 to Non-Resident Subset of Deduplication Index Segments 422. As a result of Higher Usage Ratio Deduplication Index Segment Processing 450 being performed, Resident Subset of Deduplication Index Segments 402 contains deduplication index segments 424, 406, 408, and 410, and Non-Resident Subset of Deduplication Index Segments 422 contains deduplication index segments 404, 426, 428, and 430.

Figure 5:
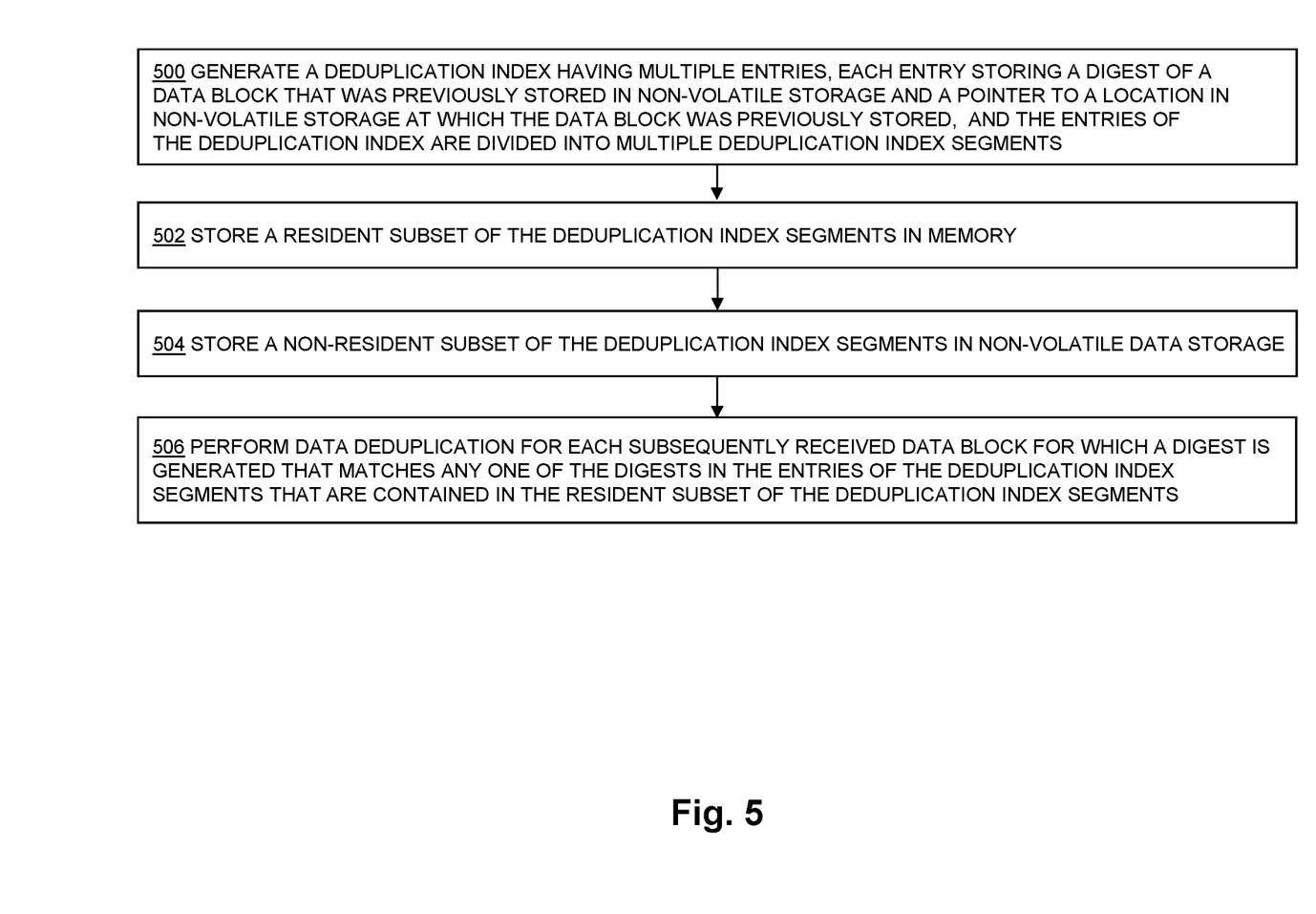
FIG. 5 is a flow chart showing an example of steps that may be performed during operation of some embodiments.

FIG. 5 is a flow chart showing an example of steps that may be performed during operation of some embodiments.

At step 500, a deduplication index is generated having multiple entries, each entry storing a digest of a data block that was previously stored in non-volatile storage and a pointer to a location in non-volatile storage at which the data block was previously stored. The entries of the deduplication index are divided into multiple deduplication index segments, each of which may have up to a maximum number of entries.

At step 502, a resident subset of the deduplication index segments are stored into a memory.

At step 504, a non-resident subset of the deduplication index segments are stored into non-volatile data storage.

At step 506, data deduplication is performed for each subsequently received data block for which a digest is generated that matches any one of the digests in the entries of the deduplication index segments that are contained in the resident subset of the deduplication index segments. Advantageously, data deduplication may be performed by the disclosed technology while processing subsequently received data blocks without accessing the deduplication index segments contained in the non-resident subset of the deduplication index segments, thus avoiding performance degradation resulting from time consuming accesses to non-volatile data storage during in-line data deduplication.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

generating a deduplication index having multiple entries, each entry storing a digest of a data block that was previously stored in non-volatile data storage and a pointer to a location in the non-volatile data storage at which the data block was previously stored, wherein the entries of the deduplication index are divided into a plurality of deduplication index segments, wherein each deduplication index segment is made up of entries containing digests generated from data blocks received and stored in the non-volatile data storage during a corresponding one of multiple preceding time periods, together with pointers to locations in the non-volatile data storage at which those data blocks were stored;

storing a resident subset of the deduplication index segments in memory;

storing a non-resident subset of the deduplication index segments in the non-volatile data storage;

performing data deduplication for each subsequently received data block for which a digest is generated that matches any one of the digests stored in the entries of the deduplication index segments that are contained in the resident subset of the deduplication index segments;

storing digests generated from subsequently received data blocks that do not match any of the digests contained in the entries of the resident subset of the deduplication index segments into entries of an open deduplication index segment also stored in the memory of a data storage system;

performing data deduplication for each subsequently received data block for which a digest is generated that matches any one of the digests in the entries of the open deduplication index segment, wherein performing data deduplication for each subsequently received data block having a digest matching any one of the digests stored in the entries in the deduplication index segments contained in the resident subset of the deduplication index segments or in the open deduplication index segment includes storing, in the non-volatile data storage of the data storage system, a pointer to the location in the non-volatile data storage at which a previously received copy of the subsequently received data block was stored;

detecting that the open deduplication index segment has reached a predetermined maximum deduplication index segment size; and in response to detecting that the open deduplication index segment has reached the predetermined maximum deduplication index segment size:
making the open deduplication index segment one of the deduplication index segments in the resident subset of the deduplication index segments, and
allocating a new open deduplication index segment within the memory of the data storage system.

2. The method of claim 1, further comprising:
maintaining usage ratios for the deduplication index segments, such that each deduplication index segment has a usage ratio indicating how often digests in the deduplication index segment match digests of data blocks received by the data storage system; and
in response to the usage ratios for the deduplication index segments, selecting as the resident subset of the deduplication index segments one or more deduplication index segments having relatively higher usage ratios than the other deduplication index segments.

3. The method of claim 2, further comprising:
detecting that a deduplication index segment in the non-resident subset of the deduplication index segments has a higher usage ratio than a usage ratio of one of the deduplication index segments in the resident subset of the deduplication index segments; and
in response to detecting that that the deduplication index segment in the non-resident subset of the deduplication index segments has a higher usage ratio than the usage ratio of the one of the deduplication index segments in the resident subset of the deduplication index segments:
moving the deduplication index segment in the non-resident subset of the deduplication index segments having the higher usage ratio to the resident subset of the deduplication index segments, and
moving the deduplication index segment in the resident subset of the deduplication index segments to the non-resident subset of the deduplication index segments.

4. The method of claim 3, further comprising:
in response to identifying a digest that is contained in both i) an entry in a deduplication index segment in the non-resident subset of the deduplication index segments, and ii) an entry contained in a deduplication index segment in the resident subset of the deduplication index segments, updating a pointer stored in the entry contained in the deduplication index segment contained in the non-resident subset of the deduplication index segments to match a pointer in the entry contained in the deduplication index segment contained in the resident subset of the deduplication index segments.

5. The method of claim 3, further comprising:
in response to identifying a digest that is contained in both i) an entry in a deduplication index segment in the non-resident subset of the deduplication index segments, and ii) an entry contained in the open deduplication index segment, removing the entry contained in the open deduplication index segment.

6. The method of claim 3, further comprising:
in response to detecting deletion of at least one data block that was previously stored in the non-volatile data storage, removing at least one entry storing at least one pointer to the deleted data block from at least one of the deduplication index segments.

7. A data storage system comprising:
at least one storage processor including processing circuitry and a memory;
a plurality of data storage drives communicably coupled to the storage processor; and
wherein the memory has program code stored thereon, wherein the program code, when executed by the processing circuitry, causes the processing circuitry to:
generate a deduplication index having multiple entries, each entry storing a digest of a data block that was previously stored in non-volatile data storage and a pointer to a location in the non-volatile data storage at which the data block was previously stored, wherein the entries of the deduplication index are divided into a plurality of deduplication index segments, wherein each deduplication index segment is made up of entries containing digests generated from data blocks received and stored in the non-volatile data storage during a corresponding one of multiple preceding time periods, together with pointers to locations in the non-volatile data storage at which those data blocks were stored,
store a resident subset of the deduplication index segments in memory,
store a non-resident subset of the deduplication index segments in the non-volatile data storage,
perform data deduplication for each subsequently received data block for which a digest is generated that matches any one of the digests stored in the entries of the deduplication index segments that are contained in the resident subset of the deduplication index segments,
store digests generated from subsequently received data blocks that do not match any of the digests contained in the entries of the resident subset of the deduplication index segments into entries of an open deduplication index segment also stored in the memory of the data storage system;
perform data deduplication for each subsequently received data block for which a digest is generated that matches any one of the digests in the entries of the open deduplication index segment, wherein performing data deduplication for each subsequently received data block having a digest matching any one of the digests stored in the entries in the deduplication index segments contained in the resident subset of the deduplication index segments or in the open deduplication index segment includes storing, in the non-volatile data storage of the data storage system, a pointer to the location in the non-volatile data storage at which a previously received copy of the subsequently received data block was stored;
detect that the open deduplication index segment has reached a predetermined maximum deduplication index segment size; and
in response to detecting that the open deduplication index segment has reached the predetermined maximum deduplication index segment size:
make the open deduplication index segment one of the deduplication index segments in the resident subset of the deduplication index segments, and
allocate a new open deduplication index segment within the memory of the data storage system.

8. The data storage system of claim 7, wherein the program code, when executed by the processing circuitry, further causes the processing circuitry to:
- maintain usage ratios for the deduplication index segments, such that each deduplication index segment has a usage ratio indicating how often digests in the deduplication index segment match digests of data blocks received by the data storage system; and
- in response to the usage ratios for the deduplication index segments, select as the resident subset of the deduplication index segments one or more deduplication index segments having relatively higher usage ratios than the other deduplication index segments.

9. The data storage system of claim 8, wherein the program code, when executed by the processing circuitry, further causes the processing circuitry to:
- detect that a deduplication index segment in the non-resident subset of the deduplication index segments has a higher usage ratio than a usage ratio of one of the deduplication index segments in the resident subset of the deduplication index segments; and
- in response to detecting that that the deduplication index segment in the non-resident subset of the deduplication index segments has a higher usage ratio than the usage ratio of the one of the deduplication index segments in the resident subset of the deduplication index segments:
  - move the deduplication index segment in the non-resident subset of the deduplication index segments having the higher usage ratio to the resident subset of the deduplication index segments, and
  - move the deduplication index segment in the resident subset of the deduplication index segments to the non-resident subset of the deduplication index segments.

10. A computer program product including a non-transitory computer readable medium having instructions stored thereon, wherein the instructions, when executed on processing circuitry, cause the processing circuitry to perform the steps of:
- generating a deduplication index having multiple entries, each entry storing a digest of a data block that was previously stored in non-volatile data storage and a pointer to a location in the non-volatile data storage at which the data block was previously stored, wherein the entries of the deduplication index are divided into a plurality of deduplication index segments, wherein each deduplication index segment is made up of entries containing digests generated from data blocks received and stored in the non-volatile data storage during a corresponding one of multiple preceding time periods, together with pointers to locations in the non-volatile data storage at which those data blocks were stored;
- storing a resident subset of the deduplication index segments in memory;
- storing a non-resident subset of the deduplication index segments in the non-volatile data storage;
- performing data deduplication for each subsequently received data block for which a digest is generated that matches any one of the digests stored in the entries of the deduplication index segments that are contained in the resident subset of the deduplication index segments;
- storing digests generated from subsequently received data blocks that do not match any of the digests contained in the entries of the resident subset of the deduplication index segments into entries of an open deduplication index segment also stored in the memory of a data storage system;
- performing data deduplication for each subsequently received data block for which a digest is generated that matches any one of the digests in the entries of the open deduplication index segment, wherein performing data deduplication for each subsequently received data block having a digest matching any one of the digests stored in the entries in the deduplication index segments contained in the resident subset of the deduplication index segments or in the open deduplication index segment includes storing, in the non-volatile data storage of the data storage system, a pointer to the location in the non-volatile data storage at which a previously received copy of the subsequently received data block was stored;
- detecting that the open deduplication index segment has reached a predetermined maximum deduplication index segment size; and
- in response to detecting that the open deduplication index segment has reached the predetermined maximum deduplication index segment size:
  - making the open deduplication index segment one of the deduplication index segments in the resident subset of the deduplication index segments, and
  - allocating a new open deduplication index segment within the memory of the data storage system.

* * * * *